Jan. 9, 1951 J. M. LESTER ET AL 2,537,065

GATE GENERATOR

Filed April 18, 1944

INVENTORS
J. M. LESTER
J. R. WILKERSON
BY Paul B. Hunter
ATTORNEY

Patented Jan. 9, 1951 2,537,065

UNITED STATES PATENT OFFICE 2,537,065

GATE GENERATOR

John M. Lester, Rockville Centre, and Jefferson R. Wilkerson, Bayside, N. Y., assignors to The Sperry Corporation, a corporation of Delaware Application April 18, 1944, Serial No. 531,598

4 Claims. (Cl. 250—27)

This invention relates to electronic circuits generally, and concerns itself more particularly with apparatus for generating gating voltages or "gates."

We are aware that it has been proposed previously to produce gating voltages, or gates, by generating a train of waves in a tuned circuit, and shaping the gate from a one-half cycle pulse of the wave train by clipping and amplifying the same.

By a novel circuit arrangement we have found it possible to greatly reduce the number of elements in this type of gate generator and to improve the form of the gate produced.

Accordingly, it is an object of the present invention to provide an improved gate producing circuit.

Another object of the present invention lies in the provision of a compact and economical gate producing device.

It is a further object of the present invention to provide a gate producing circuit having a reduced number of electron discharge devices.

Another object is to provide a gate producing circuit characterized by non-regeneration between the elements thereof.

Another object of the invention is to provide a gate generator which will produce a pulse by absorbing all but the first negative half-cycle of a wave train set up in a resonant circuit, and will subsequently clip and amplify the pulse to form a gate.

It is another object of the invention to arrange a circuit in which the natural frequency of an oscillating element may be varied to form a variable wave train, portions of which are absorbed to form a pulse which is subsequently clipped and amplified to form a variable width gate.

A still further object of the invention is the arrangement of a circuit for producing variable gates ranging from a pulse in the order of a fraction of a microsecond to a wide gate, in some instances exceeding several hundred microseconds.

Yet another object of the invention is the arrangement of an electronic discharge element in a gate generating circuit such that said element will perform a plurality of functions including those of a unilateral current-conducting element and a clipping and amplifying device.

Another object of the invention is to provide a gate generator circuit which contains a minimum number of circuit elements and which is especially adaptable to apparatus installed in air-borne equipment.

These and other objects of the invention will become apparent as the description proceeds.

In carrying out our invention in a preferred embodiment thereof, we have arranged in a gate generator circuit, a single envelope electronic discharge device, such as a twin triode, whose dual elements perform the functions of a switching tube, a unilateral current-conducting element, and a clipping and amplifying stage. For the purpose of producing a wave train, or a voltage oscillation, we have connected in the cathode lead of the first half of the tube a tuned circuit in which the oscillations are developed. The second half of the electronic discharge device is connected to receive this oscillating voltage, and two of its three electrodes act as a diode to form a pulse from the first negative half-cycle of the wave train. This pulse is then clipped and amplified by the same half of the tube to form a gate. A variable impedance means is connected across the resonant element in the cathode circuit of the first half of the tube, which may be varied to vary the period of the pulse from which the gate is generated. By this means the width of the gate may be varied from a fraction of a microsecond to a wide gate of several hundred microseconds.

A more comprehensive understanding of the invention will be afforded from the following detailed description when considered with the accompanying drawing in which.

Figure 1:
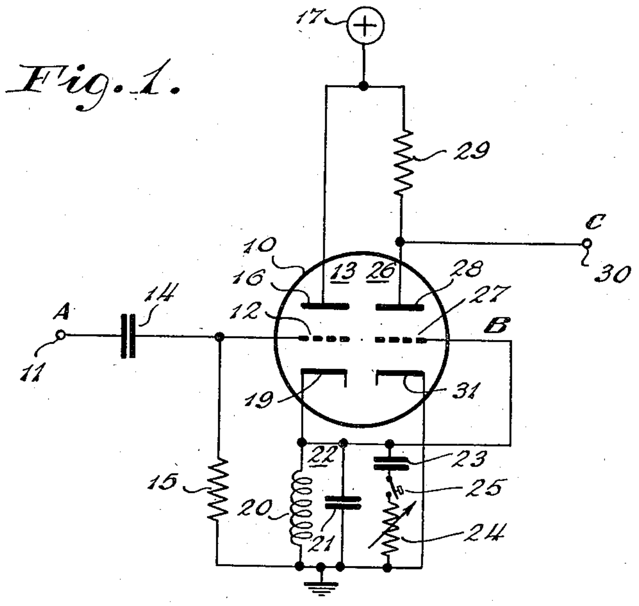
Fig. 1 is a circuit diagram of an embodiment of the invention.

In the form of the invention illustrated in Fig. 1, a single envelope, electronic discharge device 10, which may be of the twin triode type, is used to perform the function of generating a wave train in the first half thereof, from which wave train a pulse is taken which is subsequently clipped and amplified in the second half of the tube to produce a gate. A square wave of suitable form is impressed upon input terminal 11 of the circuit and delivered to grid 12 of the first half of tube 10, which acts as a single triode 13. Coupling elements, comprising a grid capacitor 14 and a grid-leak resistor 15, are provided in the grid circuit of element 13. Plate 16 of this element receives positive energy from source 17 and its cathode 19 has connected between it and ground an inductance coil 20 which together with a capacitor 21 forms a resonant circuit 22.

For the purpose of varying the period of oscillations set up in this tuned circuit 22, a variable impedance comprising a capacitor 23 and a variable resistor 24 may be connected across the tuned circuit 22 by means of a switch 25.

The second half of tube 10, which may also be considered as a single triode 26, acts as a rectifier and a clipping and amplifying device. Its grid 27 is connected to cathode 19 of the element 13 and its plate 28 receives positive energy from source 17 through a plate resistor 29. Across this resistor the desired gating voltage is developed for delivery to output terminal 30. Cathode 31 is connected to ground, as shown.

Figure 2:
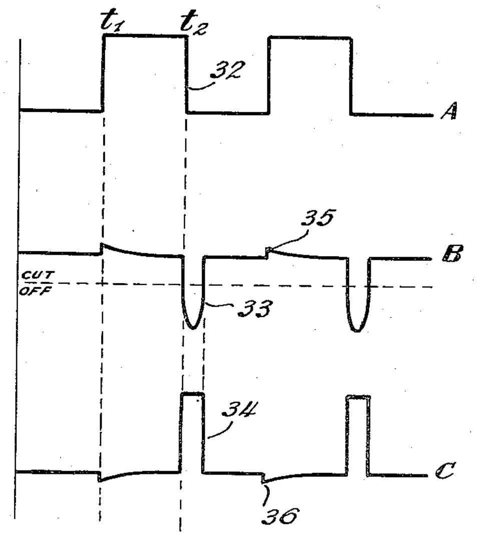
Fig. 2 is a graphical representation of the various voltage wave forms appearing at indicated points in the circuit illustrated in Fig. 1.

When a pulse, such as 32, of the input voltage A (Fig. 2) is received on the grid 12, and at time $t_1$, grid 12 is driven positive and grid current flows through the resistor 15. This action charges the grid side of capacitor 14 negatively to some fixed value. Under this action element 13 is rendered conducting and plate current and grid current flow through the inductance coil 20. At time $t_2$, grid 12 goes negative, element 13 is rendered non-conducting, and its plate current is cut off. Since the time rate of change of current flow is large, a negative pulse appears across the inductance coil 20 and oscillations are set up in the tuned circuit 22. If left undisturbed circuit branch 22 would continue to oscillate at its resonant frequency, but by the action of element 26 it is permitted to oscillate for one-half cycle only. As soon as the wave goes positive with respect to ground, grid 27 is driven positive with respect to its cathode 31 annd grid current begins to flow. This action tends to load the resonant circuit 22 causing it to stop oscillating at the termination of the first negative half-cycle, and a pulse such as 33 in voltage B (Fig. 2) is formed. This pulse which appears on grid 27 is then clipped and amplified by element 26 to produce the gate 34 in wave C, Fig. 2. Thus, pulse 33 carries element 26 beyond cut off, which clips it as illustrated in the figure and the voltage at terminal 30 goes up to the level of source 17. As grid 27 is driven positive by pulse 33, the tube is again rendered conducting and the voltage at 30 goes down. Accordingly a voltage C is developed across resistor 29, which gives the desired gate 34. In this manner element 26 of tube 10 operates both as a diode and a triode, thereby eliminating a number of circuit components.

It will be noted that a small pip 35 appears in voltage B, which in the output voltage C, forms the pip 36. The presence of this slight distortion in the wave is due to the action of the leading edge of the pulse 32. Since the inductance coil 20 provides a small amount of resistance there is a slight IR drop across it which accounts for this small pulse. Its amplitude is very slight, however, and it does not present an objectionable condition in most uses of the circuit. However, if a particular use of the circuit should require its elimination, it may be removed by passing the output of the circuit through a biased cathode follower.

It will be noted that the circuit of Fig. 1 is suitable for producing a suitable gate with the circuit constituted of only two electron discharge devices, such as triodes 13, 26. In addition, the circuit is characterized by non-regeneration between the triodes 13, 26.

There are no critical values for any of the circuit parameters and the limitations placed on the selection of apparatus elements are few. The inductance coil 20 should be chosen with as high a Q as possible, so that a pulse will appear across it only at a time when plate current is cut off in element 13. Also, the input voltage A, Fig. 2, should be of sufficient period, that is, the time between $t_1$ and $t_2$ should be of such duration that the first half of tube 10 will not be rendered conducting and non-conducting in such a short time that oscillations are not set up in the tuned circuit 22.

It is apparent that many changes could be made in the above construction and many apparently widely different embodiments of this invention could be made without departing from the scope thereof. By way of example, a variable impedance, as previously indicated, may be connected across the tuned circuit 22 to vary the period of oscillation set up therein. Accordingly, it is intended that all matter contained in the above description or shown in the accompanying drawings shall be interpreted as illustrative and not in a limiting sense.

What is claimed is:

1. In a gate generator, a first electronic discharge device having grid, anode and cathode electrodes, a high-Q resonant circuit connected in the cathode lead of said discharge device, means for connecting said anode electrode to a positive energy source, means for connecting said grid electrode to receive a square wave voltage under the influence of which said first discharge device becomes operable to set up voltage oscillations in said resonant circuit thereby to produce a wave train, a second electronic discharge device having grid, anode and cathode electrodes, means for operatively connecting said grid electrode of said second electronic discharge device to said resonant circuit, and means for connecting the electrodes of said second electronic discharge device to operate as a rectifier and a clipping and amplifying stage, said first and second electron discharge devices being the only discharge devices in said generator, and said first and second devices being characterized by non-regeneration therebetween, whereby a pulse is formed from the first negative half-cycle of said oscillating voltage and said pulse is subsequently clipped and amplified to generate a gate.

2. In a gate producing circuit, a first electron discharge device having first grid, anode and cathode electrodes, means for producing a wave train, said wave train producing means including a high-Q resonant circuit connected in the cathode lead of said first discharge device, means for connecting said anode electrode of said first discharge device to a positive energy source, means for terminating current conduction of said first electron discharge device including means for connecting said first grid electrode to receive a square-wave voltage, a second electron discharge device having second grid, anode and cathode electrodes, said second grid being connected directly to said first cathode, and means for connecting said second electrodes for clipping and amplifying the first negative half-cycle of said oscillating voltage of said resonant circuit, said first and second discharge devices being characterized by non-regenerative action therebetween, whereby a clipped and amplified gate is generated.

3. A driven gate generator comprising first and second electron discharge devices, said first electron discharge device having first anode and cathode electrodes and only one control grid, a high Q resonant wave train producing circuit connected in the cathode lead of said first discharge device, means for setting up voltage oscillations in said resonant circuit including means for connecting said one control grid to receive a control pulse to terminate the flow of current in said first electron discharge device; said second electron discharge device having second grid, anode and cathode electrodes; means for connecting said second grid electrode to said resonant circuit, and means for connecting all of said second electrodes to operate as a clipping and amplifying stage, said first and second electron discharge devices constituting the only electron discharge devices in said generator, and said first and second electron discharge devices being characterized by non-regenerative action therebetween, whereby a pulse is formed from the first negative half-cycle of said oscillating voltage and said pulse is subsequently clipped and amplified to generate a gate.

4. Apparatus as in claim 3 wherein the frequency of said resonant circuit is adjustable, comprising a series connected variable resistor and condenser shunting said resonant circuit.

JOHN M. LESTER.
JEFFERSON R. WILKERSON.

REFERENCES CITED

The following references are of record in the file of this patent:

UNITED STATES PATENTS

| Number | Name | Date |
|---|---|---|
| 1,760,957 | Ohl | June 3, 1930 |
| 1,908,249 | Hund | May 9, 1933 |
| 2,063,025 | Blumlein | Dec. 8, 1936 |
| 2,097,334 | Bowman-Manifold | Oct. 26, 1937 |
| 2,103,090 | Plebanski | Dec. 21, 1937 |
| 2,153,202 | Nichols | Apr. 4, 1939 |
| 2,181,309 | Andrieu | Nov. 28, 1939 |
| 2,208,422 | Hugon | July 14, 1940 |
| 2,226,459 | Bingley | Dec. 24, 1940 |
| 2,237,661 | Ernst | Apr. 8, 1941 |
| 2,266,668 | Tubs | Dec. 16, 1941 |
| 2,277,000 | Bingley | Mar. 17, 1942 |
| 2,408,061 | Grieg | Sept. 24, 1946 |
| 2,442,769 | Kenyon | June 8, 1948 |

OTHER REFERENCES

Proc. of I. R. E., vol. 28, No. 9, Sept. 1940, Generation of Synchronizing Pulses by Impulse Excitation by Sherman.